(12) United States Patent
Chung (10) Patent No.: US 7,509,709 B2
(45) Date of Patent: Mar. 31, 2009

(54) HINGE

(75) Inventor: Chia-Ko Chung, Shulin (TW)

(73) Assignee: Shin Zu Shing Co., Ltd., Taipei Hsien (TW)

( * ) Notice: Subject to any disclaimer, the term of this patent is extended or adjusted under 35 U.S.C. 154(b) by 0 days.

(21) Appl. No.: 11/736,079

(22) Filed: Apr. 17, 2007

(65) Prior Publication Data

US 2008/0256750 A1 Oct. 23, 2008

(51) Int. Cl.
*E05D 11/10* (2006.01)

(52) U.S. Cl. .............................. 16/330; 16/325; 16/319

(58) Field of Classification Search .................. 16/330, 16/329, 328, 327, 321, 319, 340, 339, 338, 16/337, 303; 361/681; 379/433.13; 403/120; 348/333.06; 455/575.1, 575.3, 550.1
See application file for complete search history.

(56) References Cited

U.S. PATENT DOCUMENTS

| | | | | | |
|---|---|---|---|---|---|
| 5,239,731 | A | * | 8/1993 | Lu | 16/340 |
| 5,970,819 | A | * | 10/1999 | Katoh | 74/531 |
| 6,108,868 | A | * | 8/2000 | Lin | 16/340 |
| 6,421,878 | B1 | * | 7/2002 | Kaneko et al. | 16/330 |
| 6,757,940 | B2 | * | 7/2004 | Lu et al. | 16/330 |
| 6,779,234 | B1 | * | 8/2004 | Lu et al. | 16/330 |
| 7,082,642 | B2 | * | 8/2006 | Su | 16/340 |
| 7,219,393 | B2 | * | 5/2007 | Kida | 16/221 |
| 7,222,396 | B2 | * | 5/2007 | Lu et al. | 16/340 |
| 7,275,286 | B2 | * | 10/2007 | Lu et al. | 16/340 |
| 2007/0180656 | A1 | * | 8/2007 | Chen et al. | 16/340 |

* cited by examiner

*Primary Examiner*—Victor Batson
*Assistant Examiner*—Matthew Sullivan
(74) *Attorney, Agent, or Firm*—Rabin & Berdo, P.C.

(57) ABSTRACT

A hinge is compact and can hold a monitor securely in an optimum angle even if it is long-term used. The hinge has a body, a pivoting member rotatably mounted on the body and has a pintle, a first positioning element and a second positioning element mounted on the pintle. The first positioning element has a groove formed inclinedly in a front surface at an angle. The second positioning element is simultaneously rotated with the pintle and has a rear surface corresponding to the front surface of the first positioning element and a rib formed diametrically on the rear surface. The rib corresponds to and selectively engages with the groove in the first positioning element with resilience of a resilient element to retain the pivoting member at a determined angle.

7 Claims, 7 Drawing Sheets

HINGE

BACKGROUND OF THE INVENTION

1. Field of the Invention

The present invention relates to a hinge, and more particularly to a hinge that is compact and can hold a monitor securely at an optimum angle even after a long-term of use.

2. Description of Related Art

A conventional hinge is mounted between a base and a monitor of a portable electronic device and allows the monitor to rotate relative to the base for convenience of use.

Furthermore, the conventional hinge is designed to have a monitor-positioning function that helps the monitor of the portable electronic device to hold at an optimum angle to facilitate users to watch. However, the conventional hinge having monitor-positioning function is generally constructional complicated and bulky. Moreover, deformation may occur in the components of the hinge after a long-term of use and gradually cause the hinge to lose the ability of securely holding the monitor.

To overcome the shortcomings, the present invention provides a hinge to obviate or mitigate the aforementioned problems.

SUMMARY OF THE INVENTION

The main objective of the present invention is to provide a hinge that is compact and can hold a monitor securely at an optimum angle even if after a long-term of use.

To achieve the objective, the hinge in accordance with present invention comprises a body, a pivoting member, a first positioning element, a second positioning element and a resilient element.

The body is adapted to be mounted in a base of a portable electronic device and has a pivoting hole.

The pivoting member is adapted to be mounted in a monitor of the portable electronic device and has a pintle that mounted rotatably through the pivoting hole of the body and therefore allows the monitor to pivot relative to the base.

The first positioning element is movably mounted on the pintle of the pivoting member and has a rear surface, a front surface and a groove formed inclinedly in the front surface at an angle.

The resilient element is mounted around the pintle and has an end abutting and pushing the first positioning element toward the second positioning element.

The second positioning element is mounted securely on the pintle of the pivoting member, is simultaneously rotated with the pintle and has a rear surface corresponding to the front surface of the first positioning element and a rib formed diametrically on the rear surface. The rib corresponds to and selectively engages with the groove in the first positioning element to retain the pivoting member at a determined angle.

With such an arrangement, the hinge in accordance with present invention is compact and simple in structure. Moreover, with the resilient element assisting the positioning elements to engage with each other, the hinge effectively ensures the monitor being securely held at an optimum angle even after a long-term of use.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
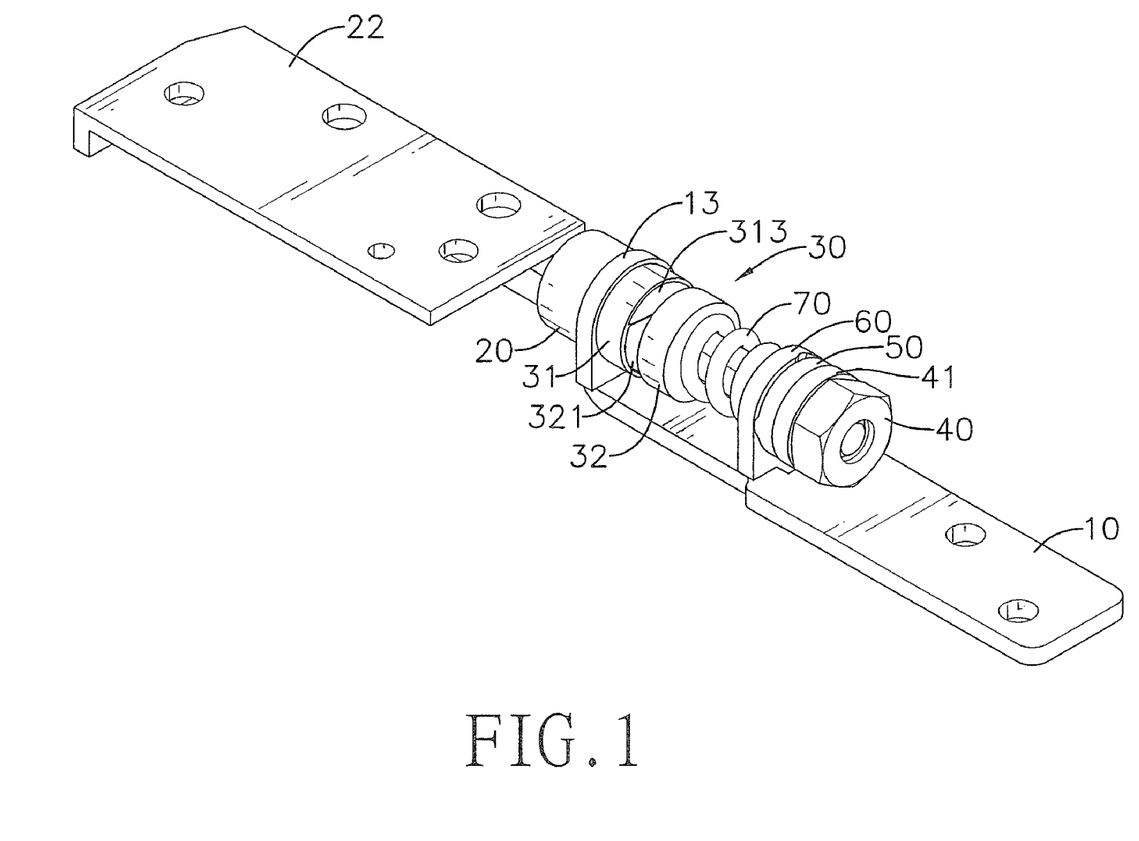
FIG. 1 is a perspective view of a hinge in accordance with the present invention.
Figure 2:
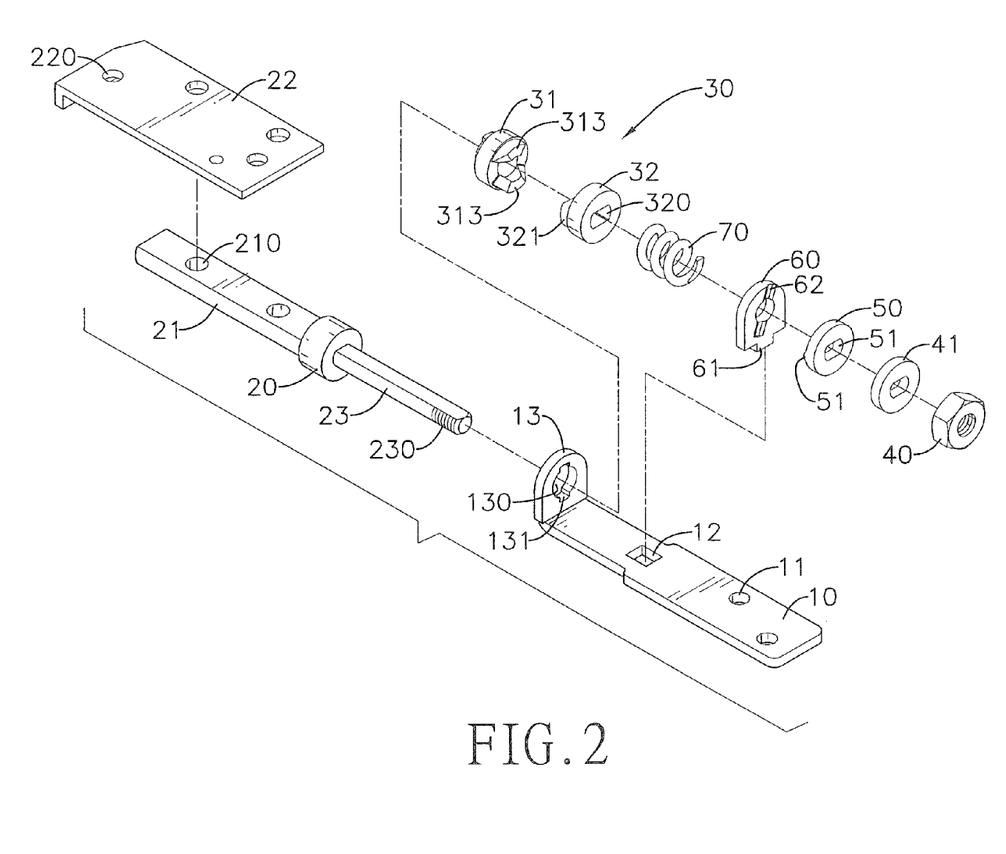
FIG. 2 is an exploded perspective view of the hinge in FIG. 1.
Figure 3:
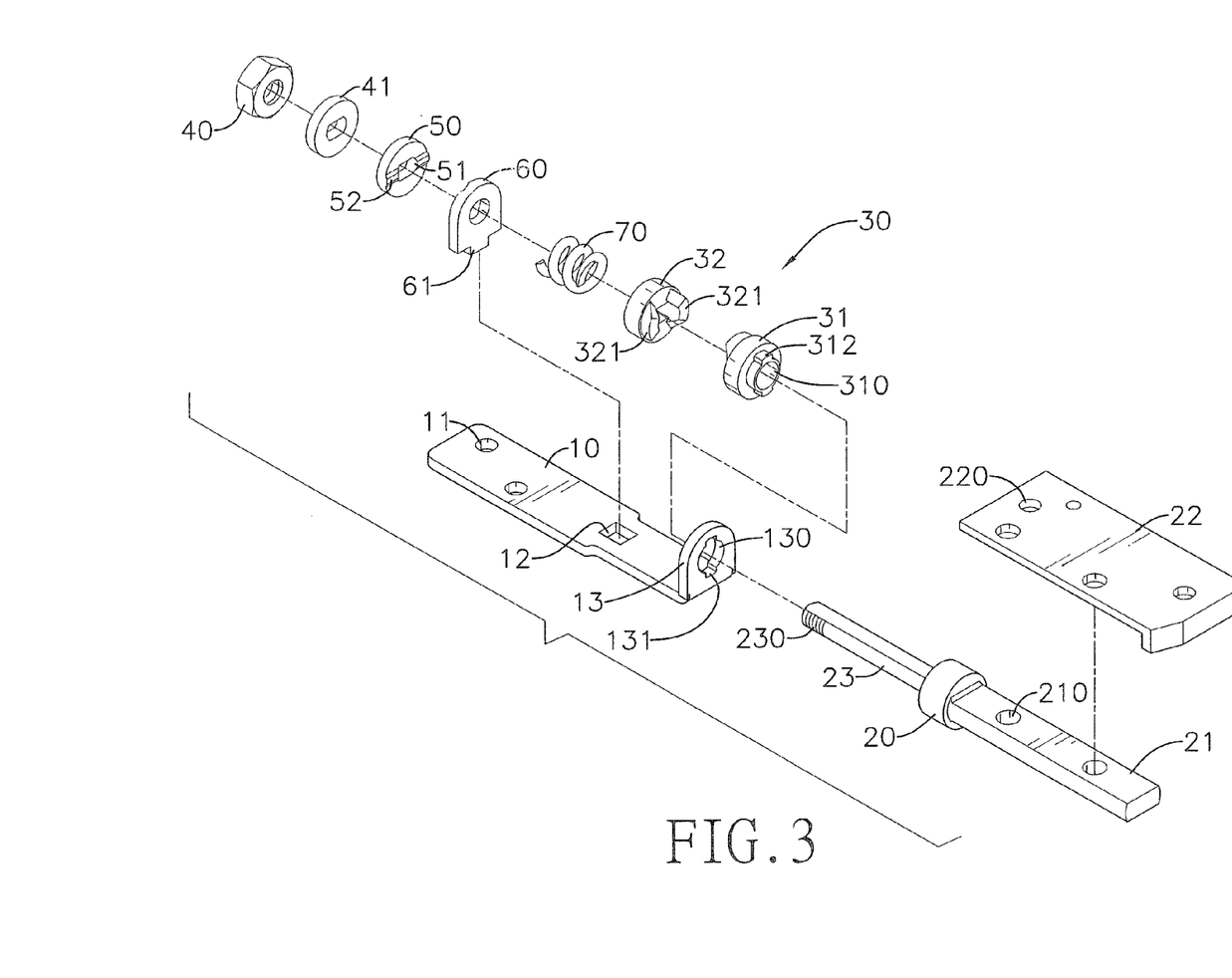
FIG. 3 is another exploded perspective view of the hinge in FIG. 1.

With reference to FIGS. 1, 2 and 3, the hinge in accordance with present invention comprises a body (10), a pivoting member (20), a retaining assembly (30), a first positioning element (60), a second positioning element (50), a resilient element (70), a fixing element (40) and a washer (41).

The body (10) is mounted securely in a base (81) of a portable electronic device (80), is elongated and has two ends, a mounting tab (13), a receiving slot (12) and multiple fixing holes (1). The mounting tab (13) is perpendicularly formed on one of the ends of the body (10) and has a pivoting hole (130) formed through the mounting tab (13) and two engaging notches (131). The engaging notches (131) are formed in the inner edge of the pivoting hole (130), communicate with the pivoting hole (130) and are diametrically opposite to each other. The receiving slot (12) is formed longitudinally through the body (10) and has a length. The fixing holes (11) are separately formed through the body (10) for securing the base (81) with fasteners.

The pivoting member (20) is mounted securely in a monitor (82) of the portable electronic device (80), is mounted rotatably on the body (10) and has a mounting portion (21) and a pintle (23). The mounting portion (21) has multiple securing holes (210) and a fixing tab (22) mounted securely to the mounting portion (21) with fasteners extending through the fixing tab (22) and the securing holes (210) in the mounting portion (21). The fixing tab (22) has multiple fixing holes (220) for securing the monitor (82) with fasteners. The pintle (23) is mounted rotatably through the pivoting hole (130) of the body (10), is non-circular in cross section and has a threaded end (230).

Figure 4:
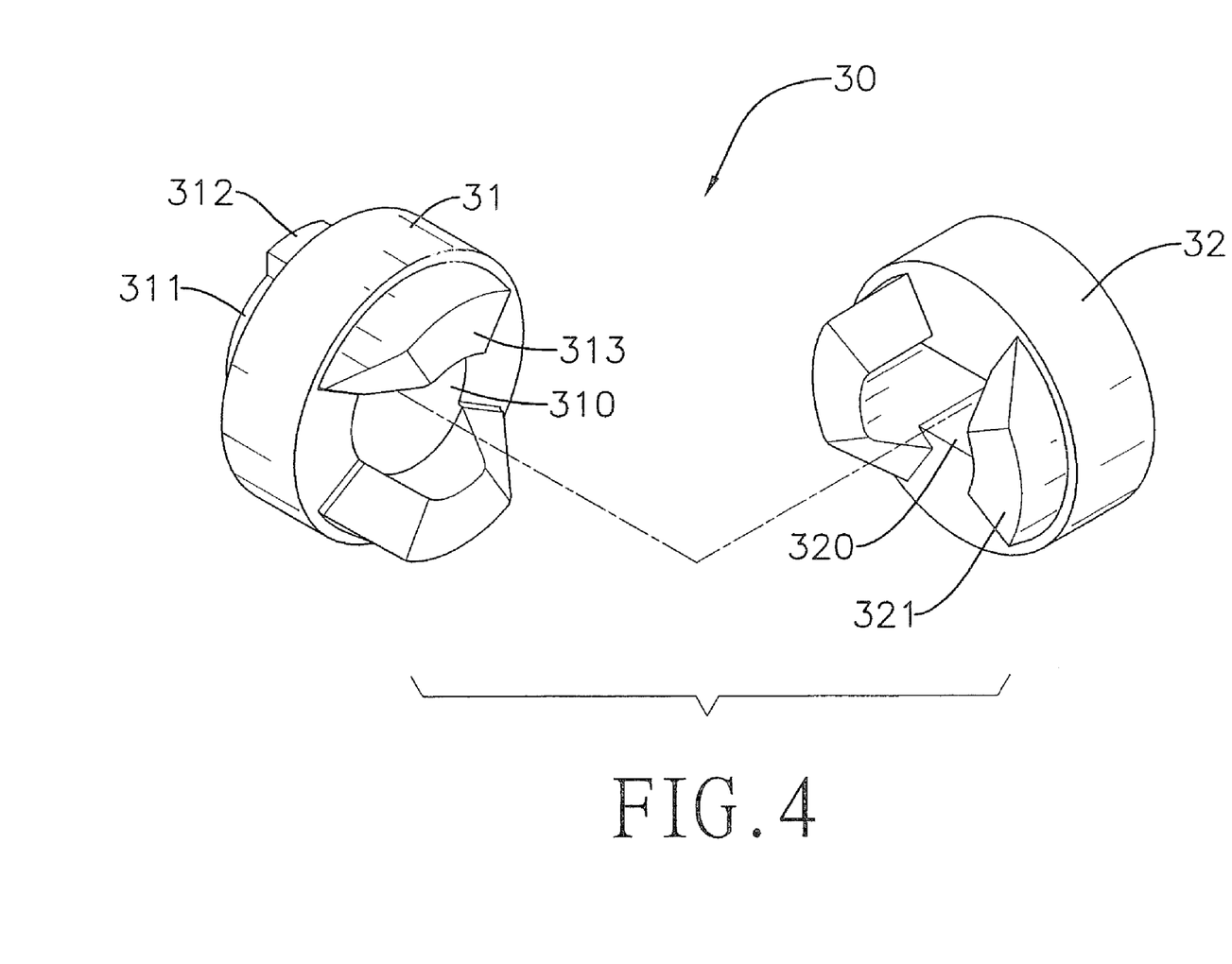
FIG. 4 is an enlarged exploded perspective view of the retaining assembly of the hinge in FIG. 1.
Figure 5:
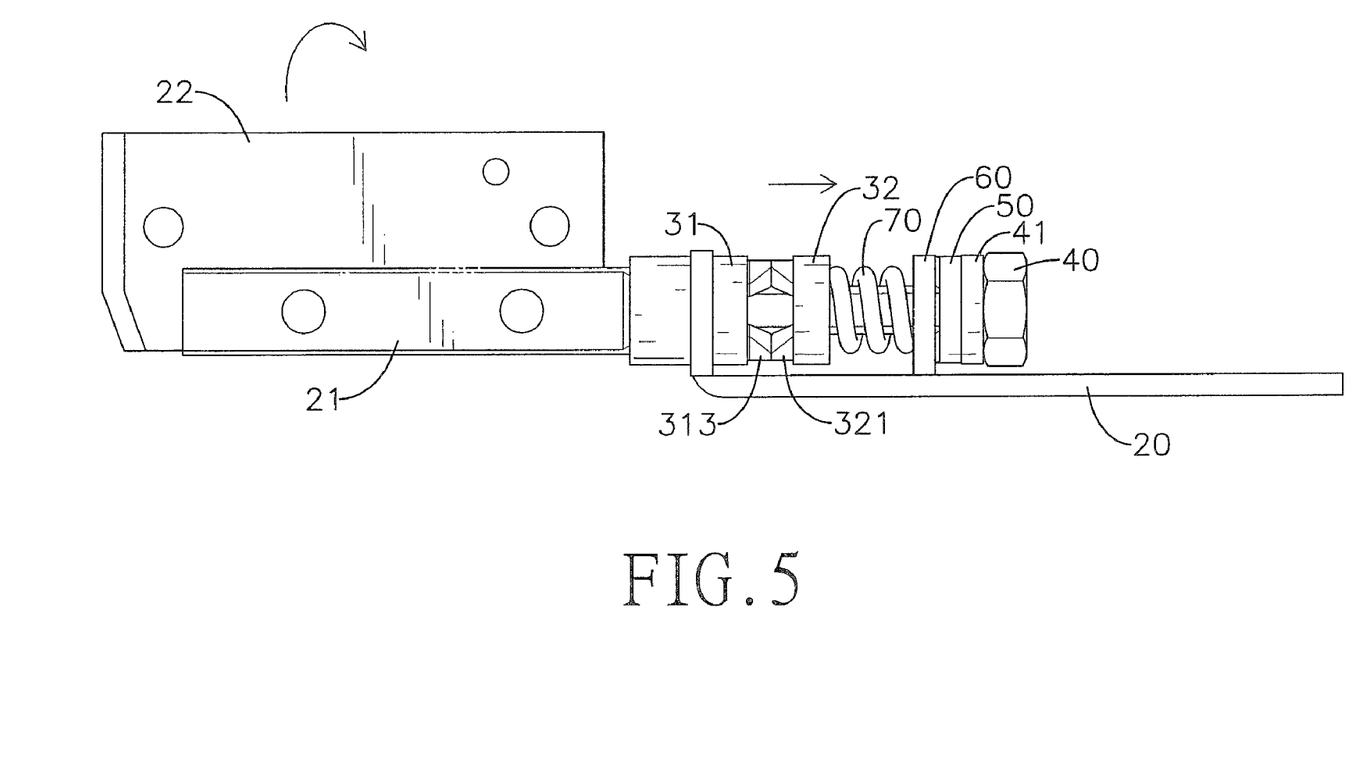
FIG. 5 is a side view of the hinge in FIG. 1.

With further reference to FIGS. 4 and 5, the retaining assembly (30) comprises a first retaining element (31) and a second retaining element (32). The first retaining element (31) is mounted on the pintle (23) and has a rear surface, a front surface, a central hole (310), a sleeve (311), two protrusions (312) and two first teeth (313). The central hole (310) is formed through the first retaining element (31) and rotatably mounts around the pintle (23). The sleeve (311) protrudes from the rear surface of the first retaining element (31). The protrusions (312) oppositely protrude from the rear surface of the first retaining element (31) and are formed around the sleeve (311) to engage respectively with the engaging notches (131) in the mounting tab (13) of the body (10) so as to secure the first retaining element (31) in the pivoting hole (130) of the body (10). The first teeth (313) protrude oppositely from the front surface of the first retaining element (31) and each first tooth (313) has two sloping side edges. The second retaining element (32) is slidably mounted on the pintle (23)

and has a rear surface, a front surface, a mounting hole (320) and two second teeth (321). The mounting hole (320) is formed through the second retaining element (32), is non-circular in cross section and engages with the pintle (23) so as to make the second retaining element (32) simultaneously rotate with the pintle (23). The second teeth (321) protrude oppositely from the rear surface of the second retaining element (32) and each second tooth (321) has two sloping side edges. The second teeth (321) sequentially engage with the first teeth (313) to selectively hold the monitor (82) in a folded position or an unfolded position.

The first positioning element (60) is movably mounted on the pintle (23) of the pivoting member (20), moves along the pintle (23) and has a rear surface, a front surface, a bottom, a plank (61) and a groove (62). The plank (61) protrudes from the bottom of the first positioning element (60), is received in the receiving slot (12) of the body (10) to allow the first positioning element (60) to move but not rotate relative to the body (10) and additionally limits the moving travel of the first positioning element (60). The groove (62) is formed inclinedly in the front surface of the first positioning element (60) at an angle relative to the body (10).

The second positioning element (50) is mounted on the pintle (23) of the pivoting member (20) and has a rear surface, a front surface, a center, an engaging hole (51) and a rib (52). The rear surface corresponds to the front surface of the first positioning element (60). The engaging hole (51) formed through the center of the second positioning element (50), is non-circular in cross section and engages with the pintle (23) so as to make the second positioning element (50) simultaneously rotate with the pintle (23). The rib (52) is formed diametrically on the rear surface and corresponds to and selectively engages with the groove (62) in the first positioning element (60) to retain the pivoting member (20) in a determined angle based on the inclined groove (62).

With further reference to FIG. 5, the resilient element (70) is mounted around the pintle (23) and has a second end and a first end. The second end abuts the front surface of the second retaining element (32) and pushes the second retaining element (32) toward the first retaining element (31). The first end abuts the rear surface of the first positioning element (60) and pushes the first positioning element (60) toward the second positioning element (50).

The fixing element (40) may be a nut, is screwed onto the threaded end (230) of the pintle (23) and holds the first retaining element (31), the second retaining element (32), the first positioning element (60), the second positioning element (50) and the resilient element (70) on the pintle (23).

The washer (41) is mounted on the pintle (23) between the fixing element (40) and the second positioning element (50) to prevent abrasion.

Figure 6:
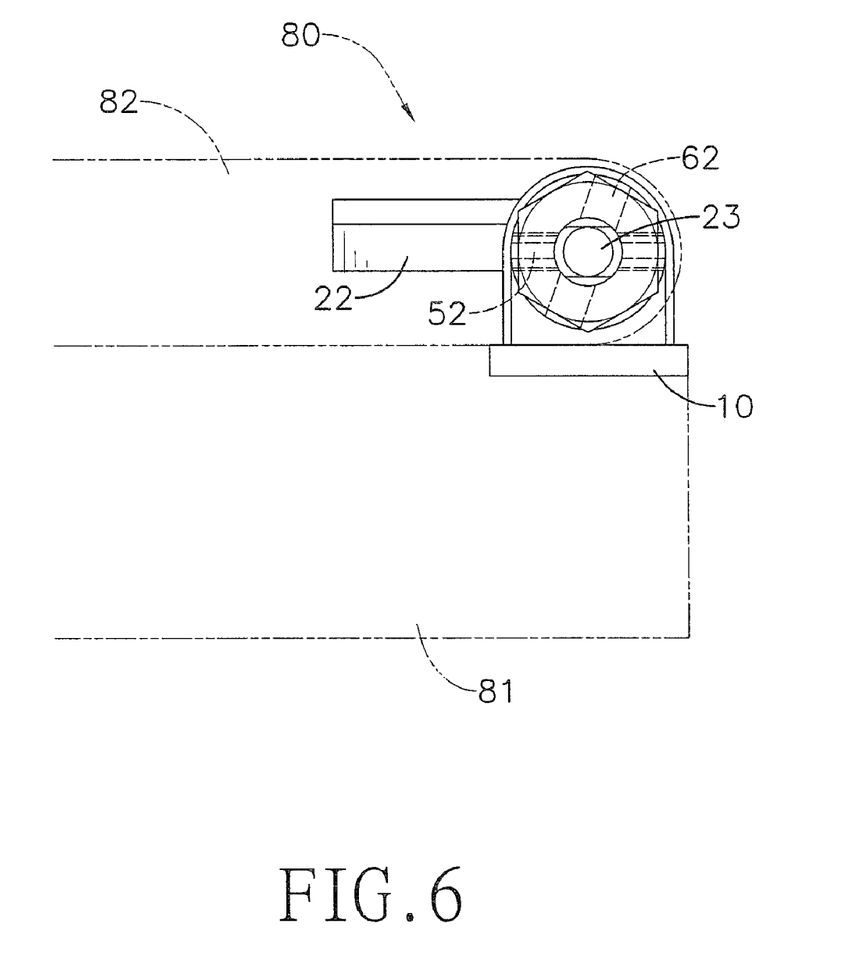
FIG. 6 is an operational end view of the hinge in FIG. 1 mounted in a portable electronic device.
Figure 7:
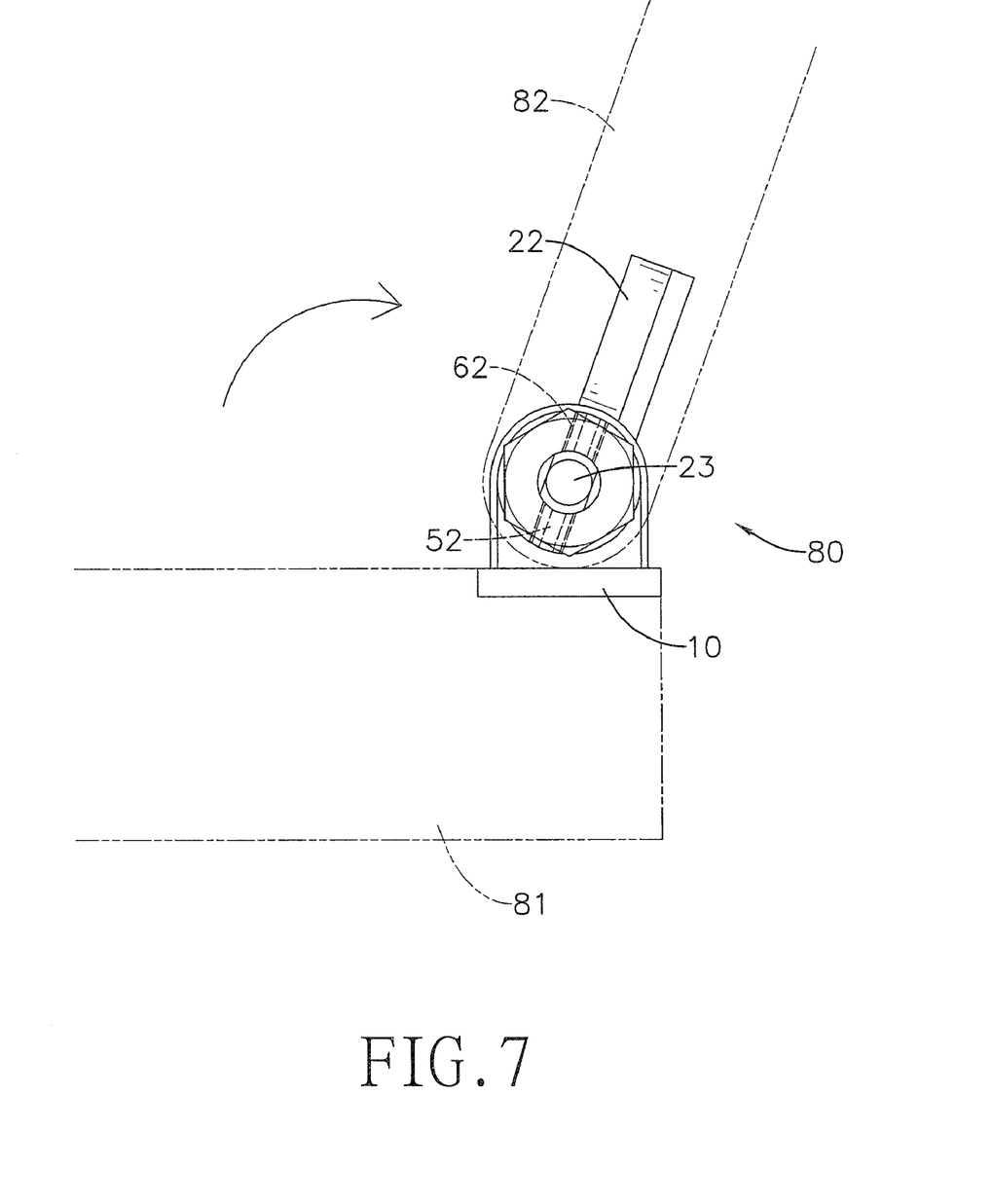
FIG. 7 is another operational end view of the hinge in FIG. 1 mounted in the portable electronic device.

With reference to FIGS. 5, 6, 7, when the monitor (82) of the portable electronic device (80) is pivoted relative to the base (81), the rib (52) will engage with the groove (62) to retain the monitor (82) at the determined angle where is optimum for viewers to watch.

Accordingly, the hinge in accordance with present invention is compact and simple in structure. Moreover, with the resilient element (70) assisting the positioning elements to engage with each other, the hinge effectively ensures the monitor (82) being securely held at an optimum angle relative to the base (81) even if after a long-term of use.

Even though numerous characteristics and advantages of the present invention have been set forth in the foregoing description together with details of the structure and function of the invention, the disclosure is illustrative only. Changes may be made in detail especially in matters of shape, size and arrangement of parts within the principles of the invention to the full extent indicated by the broad general meaning of the terms in which the appended claims are expressed.

What is claimed is:

1. A hinge, comprising:
    an elongated body having
        two ends;
        a mounting tab perpendicularly formed on one of the ends of the body and having a pivoting hole formed through the mounting tab; and
        a receiving slot formed longitudinally through the body and having a length;
    a pivoting member mounted rotatably on the body and having
        a mounting portion; and
        a pintle mounted rotatably through the pivoting hole of the body and being non-circular in cross section;
    a first positioning element movably mounted on the pintle of the pivoting member and having
        a rear surface;
        a front surface;
        a bottom;
        a groove formed inclinedly in the front surface of the first positioning element at an angle relative to the body; and
        a plank protruding from the bottom of the first positioning element and being received in the receiving slot of the body;
    a second positioning element mounted on the pintle of the pivoting member and having
        a rear surface corresponding to the front surface of the first positioning element;
        a front surface;
        an engaging hole formed through the second positioning element, being non-circular in cross section and engaging with the pintle; and
        a rib formed diametrically on the rear surface and corresponding to and selectively engaging with the groove in the first positioning element to retain the pivoting member at an angle based on the inclined groove; and
    a resilient element mounted around the pintle and having a first end abutting the rear surface of the first positioning element and pushing the first positioning element toward the second positioning element.

2. The hinge as claimed in claim 1, further comprising a retaining assembly having
    a first retaining element securely mounted in the pivoting hole of the body and having
        a rear surface;
        a front surface;
        a central hole formed through the first retaining element and being rotatably mounted around the pintle; and
        two first teeth protruding oppositely from the front surface of the first retaining element and each first tooth having two sloping side edges; and
    a second retaining element slidably mounted on the pintle and having
        a rear surface;
        a front surface;
        a mounting hole formed through the second retaining element, being non-circular in cross section and engaging with the pintle; and
        two second teeth protruding oppositely from the rear surface of the second retaining element and each second tooth having two sloping side edges and sequentially engaging with the first teeth, wherein the resilient element has a second end abutting the front surface of the second retaining element and pushing the second retaining element toward the first retaining element.

3. The hinge as claimed in claim 2, wherein the mounting tab of the body further has two engaging notches formed in an inner edge of the pivoting hole, communicating with the pivoting hole and diametrically opposite to each other;

the first retaining element of the retaining assembly further has two protrusions oppositely protruding from the rear surface of the first retaining element and engaging respectively with the engaging notches of the mounting tab of the body to secure the first retaining element in the pivoting hole of the body.

4. The hinge as claimed in claim 2, wherein the pintle of the pivoting member further has a threaded end; and the hinge further has a fixing element screwed onto the threaded end of the pintle and holding the first retaining element, the second retaining element, the first positioning element, the second positioning element and the resilient element on the pintle; and a washer mounted on the pintle between the fixing element and the second positioning element to prevent abrasion.

5. The hinge as claimed in claim 4, wherein the body further has a plurality of fixing holes separately formed through the body.

6. The hinge as claimed in claim 5, wherein the mounting portion has a plurality of securing holes; and a fixing tab mounted securely to the mounting portion and having a plurality of fixing holes.

7. A hinge, comprising:

an elongated body having two ends; and a mounting tab perpendicularly formed on one of the ends of the body and having a pivoting hole formed through the mounting tab;

a pivoting member mounted rotatably on the body and having a mounting portion; and a pintle mounted rotatably through the pivoting hole of the body and being non-circular in cross section;

a first positioning element movably mounted on the pintle of the pivoting member and having a rear surface;

a front surface;

a bottom; and a groove formed inclinedly in the front surface of the first positioning element at an angle relative to the body;

a second positioning element mounted on the pintle of the pivoting member and having a rear surface corresponding to the front surface of the first positioning element;

a front surface;

an engaging hole formed through the second positioning element, being non-circular in cross section and engaging with the pintle; and a rib formed diametrically on the rear surface and corresponding to and selectively engaging with the groove in the first positioning element to retain the pivoting member in an angle based on the inclined groove;

a resilient element mounted around the pintle and having a first end abutting the rear surface of the first positioning element and pushing the first positioning element toward the second positioning element; and a retaining assembly having a first retaining element securely mounted in the pivoting hole of the body and having a rear surface;

a front surface;

a central hole formed through the first retaining element and being rotatably mounted around the pintle; and two first teeth protruding oppositely from the front surface of the first retaining element and each first tooth having two sloping side edges; and a second retaining element slidably mounted on the pintle and having a rear surface;

a front surface;

a mounting hole formed through the second retaining element, being non-circular in cross section and engaging with the pintle; and two second teeth protruding oppositely from the rear surface of the second retaining element and each second tooth having two sloping side edges and sequentially engaging with the first teeth, wherein the resilient element has a second end abutting the front surface of the second retaining element and pushing the second retaining element toward the first retaining element.

* * * * *